United States Patent
Sakai et al.

(10) Patent No.: US 7,158,853 B2
(45) Date of Patent: Jan. 2, 2007

(54) PATTERN RECOGNITION FOR SHEET METAL PART MODELS

(75) Inventors: Satoshi Sakai, Newport Beach, CA (US); Masanobu Ishii, Laguna Hills, CA (US)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 10/971,124

(22) Filed: Oct. 25, 2004

(65) Prior Publication Data

US 2006/0089738 A1   Apr. 27, 2006

(51) Int. Cl.
*G06F 19/00* (2006.01)

(52) U.S. Cl. .................. 700/182; 700/97; 700/117; 700/145

(58) Field of Classification Search .............. 700/95, 700/97, 98, 182, 117, 145, 165, 174; 378/4, 378/901; 708/131; 703/1, 6, 7
See application file for complete search history.

(56) References Cited

U.S. PATENT DOCUMENTS

| | | | |
|---|---|---|---|
| 4,747,153 A | 5/1988 | Kouno et al. | |
| 4,912,644 A | 3/1990 | Aoyama et al. | |
| 4,998,206 A | 3/1991 | Jones | |
| 5,029,462 A | 7/1991 | Wakahara et al. | |
| 5,115,400 A | 5/1992 | Watanabe et al. | |
| 5,237,647 A | 8/1993 | Roberts et al. | |
| 5,297,054 A | 3/1994 | Kienzle et al. | |
| 5,307,282 A | 4/1994 | Conradson et al. | |
| 5,315,522 A | 5/1994 | Kauffman et al. | |
| 5,396,265 A | 3/1995 | Ulrich et al. | |
| 5,429,682 A | 7/1995 | Harlow et al. | |
| 5,434,791 A | 7/1995 | Koko et al. | |
| 5,650,800 A | 7/1997 | Benson | |
| 5,687,094 A | 11/1997 | Kagawa et al. | |
| 5,822,207 A | 10/1998 | Hazama et al. | |
| 5,828,575 A | 10/1998 | Sakai | |
| 5,835,684 A | 11/1998 | Bourne et al. | |
| 5,864,482 A * | 1/1999 | Hazama et al. ............. 700/182 |
| 5,886,897 A | 3/1999 | Hazama et al. | |
| 5,889,926 A | 3/1999 | Bourne et al. | |
| 5,898,590 A | 4/1999 | Wampler et al. | |
| 5,969,973 A | 10/1999 | Bourne et al. | |
| 5,971,589 A | 10/1999 | Hazama et al. | |
| 6,065,857 A | 5/2000 | Hazama et al. | |
| 6,185,476 B1 | 2/2001 | Sakai | |

(Continued)

FOREIGN PATENT DOCUMENTS

EP   0290809   11/1988

(Continued)

OTHER PUBLICATIONS

Chu, Wesley W., et al., *Cooperative Query Answering Via Type Abstraction Hierarchy*, Computer Science Department Technical Report, CSD-900032, Department of Computer Science, University of California, Los Angeles, pp. 1-28 (Oct. 1990).

(Continued)

*Primary Examiner*—Leo Picard
*Assistant Examiner*—Charles Kasenge
(74) *Attorney, Agent, or Firm*—Greenblum & Bernstein, P.L.C.

(57) ABSTRACT

Analysis is performed on sheet metal products to determine characteristics (or feature vectors) of the sheet metal products. Multiple feature vectors can be obtained for each sheet metal product. Exemplary analyses include a first order moment and a second order moment. The characteristics can be compared with characteristics of other sheet metal part shapes to determine how similar the shapes are.

27 Claims, 10 Drawing Sheets

U.S. PATENT DOCUMENTS

| | | | |
|---|---|---|---|
| 6,212,441 | B1 | 4/2001 | Hazama et al. |
| 6,219,586 | B1 | 4/2001 | Sakai |
| 6,224,249 | B1 | 5/2001 | Ozawa et al. |
| 6,243,611 | B1 | 6/2001 | Hazama et al. |
| 6,327,514 | B1 | 12/2001 | Hazama et al. |
| 6,341,243 | B1 | 1/2002 | Bourne et al. |
| 6,411,862 | B1 | 6/2002 | Hazama et al. |
| 6,493,607 | B1 | 12/2002 | Bourne et al. |
| 6,507,767 | B1 | 1/2003 | Bourne et al. |
| 6,539,399 | B1 | 3/2003 | Hazama et al. |
| 6,629,093 | B1 | 9/2003 | Davis et al. |
| 2002/0038163 | A1 | 3/2002 | Hazama |
| 2003/0171840 | A1 | 9/2003 | Haupt |
| 2004/0019042 | A1 | 1/2004 | Bourne et al. |

FOREIGN PATENT DOCUMENTS

| | | |
|---|---|---|
| EP | 0397904 | 11/1990 |
| EP | 0402475 | 12/1990 |
| EP | 0419013 | 3/1991 |
| EP | 0485766 | 5/1992 |
| EP | 0664186 | 7/1995 |

OTHER PUBLICATIONS

Chiang, Kuorong, *Automatic Generation of Type Abstraction Hierarchies For Cooperative Query Answering* (A dissertation submitted as part of the requirements for the degree of Doctor of Philosophy in Computer Science), University of California, Los Angeles, pp. 1-98 (1995).

Mortenson, Michael E., *Geometric Modeling* (Title Page & Table of Contents), John Wiley & Sons, New York (1988).

Foley, James D., et al., *The Systems Programming Series: Fundamentals of Interactive Computer Graphics*, (Title Page & Table of Contents), Addison-Wesley Publishing Co., Reading, Massachusetts (Mar. 1983).

Mantyla, Martti, *An Introduction To Solid Modeling* (Title Page & Table of Contents), Computer Science Press, Inc., Rockville, Maryland (1988).

Wesley, M.A., et al., "Fleshing Out Projections", *IBM J. Res. Develop.*, vol. 25, No. 6, pp. 934-954 (Nov. 1981).

Aomura, Shigeru, et al., "Creating Solid Model With Machine Drawings", *The Sixth Computational Mechanics Conference*, JSME, No. 930-71, pp. 497-498, Japan (1983).

Aomura, Shigeru, "Recent Trends And Future Prospect Of Research And Practical Use (Automatic Reconstruction of 3D Solid From Drawings)", JSME, No. 586-61, pp. 2180-2187, Japan (1995).

Open GL Architecture Review Board, *Open GL Reference Manual* (Title Page & Table of Contents), Release 1, Open GL Architecture Review Board, Addison-Wesley Publishing Co., Reading Massachusetts (Jan. 1995).

Open GL Architecture Review Board, *Open GL Reference Manual* (Title Page & Table of Contents), Release 1, Open GL Architecture Review Board, Addison-Wesley Publishing Co., Reading Massachusetts (Jun. 1995).

Criterion Software Ltd., *RenderWare, API Reference Manual* (Title Page & Table of Contents), V2.0, Criterion Software Ltd., United Kingdom (Oct. 1995).

Toyo Engineering Corp. (TEC), *2D-3D: UNKEI/Solid and UNKEI/Drawing Check & Projection/Reconstruction System*, Sales Brochure, Toyo Engineering Corp. (TEC), Tokyo, Japan (1993).

Naessens, Diederik, "Flexible Automation On Press Brakes", *American Machinist*, pp. 36-39 (Jun. 1994).

Wysong Literature, *The Perfect Forming Touch: New, PH PLUS Series, DNC Press Brakes*, Cat. PHP-1, Wysong & Miles Company, Greensboro, North Carolina (1993).

Bourne, David A., "Intelligent Manufacturing Workstations", *Knowledge-Based Automation of Processes*, Session at the 1992 ASME Winter Annual Meeting (Nov. 1992).

Bourne et al., "Using the Feature Exchange Language in the Next Generation Controller," CMU-RI-TR-90-19, *The Robotic Institute at Carnegie Mellon University*, Pittsburgh, PA (Aug. 1990).

Bourne et al., "Operational Feature Exchange Language," CMU-RI-TR-90-06, *The Robotic Institute at Carnegie Mellon University*, Pittsburgh, PA (Mar. 1990).

Nilsson, Nils J., "Program-Solving Methods in Artificial Intelligence", McGraw-Hill Book Company, New York, Chapter 3, pp. 43-67 (1971).

Erion, "Generic Environment for LISP Based Experts", Center for Integrated Manufacturing Decision Systems, Carnegie Mellon University, pp. 113-136 (Mar. 1990).

Bourne, D., et al., "Feature Exchange Language Programmer's Guide", The Robotics Institute at Carnegie Mellon University, Pittsburgh, PA (Jan. 1994).

Hou et al., "Medical Image retrieval by Spatial Features", Proceedings of the Systems, Man, and Cybernetics 1992 Intl. Conference, pp. 1364-1369.

Trappey et al., "A Data Representation scheme for Sheet Metal Parts: Expressing Manufacture and Features and Tolerance Requirements," *Journal of Manufacturing Systems*, vol. 14, No. 6, pp. 393-405, ISSN-0278-6125 (1995).

Wang, Cheng-Hua, "A Parallel Design System For Sheet Metal Parts", *Mechanical Engineering Report*, presented to the Mechanical Engineering Department, Carnegie Mellon University, Pittsburgh, Pennsylvania, pp. 1-31 (May 1992).

Wang, Cheng-Hua, et al., "Concurrent Product/Process Design With Multiple Representations Parts", IEEE, No. 1050-4729/93, pp. 298-304 (1993).

U.S. Amada, Ltd., *Amada Unfold: Manual for Autocad*, Table of Contents, Index & pp. 1-28, U.S. Amada, Ltd., Buena Park, California (Mar. 1994).

U.S. Amada, Ltd., *Amada Unfold: Manual for Cadkey*, Table of Contents, Index & pp. 1-18, U.S. Amada, Ltd., Buena Park, California (May 1994).

U.S. Amada, Ltd., *Amada Windows Unfold: Manual for Cadkey*, Table of Contents, pp. 1-35, & Index, U.S. Amada, Ltd., Buena Park California (Nov. 1995).

Amada Co., Ltd., *AMACOM; AP40 Literature*, Version 4, Amada Co., Ltd., Japan (Jul. 1996).

Amada Co., Ltd., *AMACOM; AP60 Literature*, Amada Co., Ltd., Japan (Jul. 1996).

Amada Co., Ltd., *AMACOM; AP200 Literature*, Amada Co., Ltd., Japan (Jul. 1996).

Amada Co., Ltd., *Bending Soft*, Literature on the AMACOM AP40, No. 9112-01, Amada Co., Ltd., Japan (Dec. 1991).

SPI GmbH, "Sheetmetal Desktop 3.01", Ahrensburg, Germany, published 1998, (http://www.spi.de/sheetmet/sml.htm).

SPI GmbH, "Sheetmetal Works 98Plus", Ahrensburg, Germany, published 1998, (http://www.spi.de/metalworks/smw$_{13}$ eng.htm.

SPI GmbH, "Sheetmetal AutoCAD 2000", Ahrensburg, Germany, published 1999, (http://www.spi.de/sheetmet/sma/htm).

IBM, "Method For Understanding Drawing Attributes For 3D Models", IBM Technical Disclosure Bulletin, vol. 37, No. 07, pp. 99-104 (Jul. 1994).

Tseng, Yuan-Jye, et al., "Recognizing Multiple Interpretations Of Interacting Machining Features", Computer-Aided Design, vol. 26, No. 9, pp. 667-688 (Sep. 1994).

Gu, P., et al., "Product Modelling Using STEP", Computer-Aided Design, vol. 27, No. 3, pp. 163-179 (Mar. 1995).

Papanikolopoulos, Nikolaos P., "FORS: A System For Flexible Design," *Conference Proceedings: 1990 IEEE International Conference On Systems, Man, And Cybernetics*, Los Angles, California, pp. 724-726, Nov. 4-7, 1990.

Patent Abstracts of Japan, vol. 018, No. 689 (P-1850), Dec. 26, 1994 & JP 06 274219 (Mutoh Ind. Ltd.).

Yee et al., "3-D localization and feature recovering through CAD-based stable pose calculation," Pattern Recognition Letters, No. 22, pp. 105-121 (2001).

\* cited by examiner

PATTERN RECOGNITION FOR SHEET METAL PART MODELS

BACKGROUND OF THE INVENTION

1. Field of the Invention

The present invention relates to the field of computer-aided design for sheet metal parts. More particularly, the present invention relates to recognizing patterns in sheet metal parts.

2. Background Information

The ability to recognize patterns in sheet metal parts would be useful. One use for pattern recognition is searching for similar parts. When designing a new 3D object (i.e., target object) on a computer-aided design (CAD) system, it is sometimes more efficient to start with a similar object and modify the similar object to create the desired object, rather than to design the new object from scratch. In order to start with the similar object, a user searches for an object having some type of similarity to the target object.

Many attempts have been made to find geometrical similarities of 3D solid objects. None of the previous attempts, however, have succeeded in recognizing patterns of sheet metal part models to enable accurate comparison of sheet metal parts due to the hollowness or emptiness of sheet metal shapes. For example, as shown in FIG. 1, it can be seen that two superimposed solid part models, which are not identical, share a large common area. Thus, an analysis would indicate that the models are similar. Similar superimposed sheet metal part models, however, do not have a large amount of overlap, as seen in FIG. 2. Thus, an analysis would indicate that the parts are not similar, when in fact they are similar.

In addition, directly comparing 3D geometries of part shapes is inaccurate and time consuming because such a geometric comparison of part shapes is very sensitive to size, orientations, etc. of shapes Thus, direct comparison often creates ambiguous search results.

Current systems, such as the system disclosed in U.S. Pat. No. 6,539,399 to HAZAMA et al., issued on Mar. 25, 2003, have a function for searching for similar sheet metal parts. However, the HAZAMA et al. system does not recognize patterns of sheet metal shapes and thus only searches by text such as "part name", "updated date", "material name", "machine name," etc. When the user wants to search parts by shape instead of text, for example, when a user only knows a cross section view of a part, or when a user only knows the flat shape, the HAZAMA et al. system has shortcomings.

Moreover, the input of search criteria in prior systems is inadequate. Previous search systems for sheet metal shapes used a complete sheet metal shape as a search key. This approach requires users to create a complete sheet metal part in order to perform a simple search. Finding a similar part model is no longer necessary because the exact part has been designed. If the user could merely specify cross sections or a 2D flat shape in order to search parts, it would be very useful and save time during manufacturing processes.

SUMMARY OF THE INVENTION

In view of the foregoing, the present invention is directed to recognizing patterns in sheet metal part shapes. Pattern recognition can be used to facilitate searching for similar parts.

In an embodiment of the present invention, a method is provided for specifying characteristics of a sheet metal product. The method includes obtaining feature vectors derived from at least one characteristic extraction method. In one embodiment, applying a moment is the characteristic extraction method of the sheet metal product. The moment can be a first order moment and/or a second order moment.

The method may also include comparing a feature vector of the sheet metal part product with a feature vector of another sheet metal part product. A level of similarity between the sheet metal part products can then be determined based upon the comparison.

In one embodiment, the moment is applied to a 3D sheet metal part shape. In another embodiment, the moment is applied to a 2D sheet metal part shape. In yet another embodiment, the moment is applied to a 3D sheet metal part shape and a 2D sheet metal part shape.

The method may also include obtaining at least one other feature vector of the sheet metal product. In this case, the feature vectors are compared to determine a refined level of similarity. The comparison includes comparing the feature vectors of the sheet metal product with feature vectors of another sheet metal product to determine the refined degree of similarity between the sheet metal products. A user can select the feature vectors, and assign a weight to each selected feature vector. The refined degree of similarity is then determined based upon the assigned weights and the selected feature vectors.

Another feature vector includes performing a sheet metal CT scan cross section of the sheet metal product. This feature vector can include performing a UZ analysis.

In another aspect of the present invention, a computer readable medium is provided for storing a program for specifying characteristics of a sheet metal product. The medium includes a feature vector code segment that obtains feature vectors derived from at least one characteristic extraction method.

In one embodiment, applying a moment is the characteristic extraction method of the sheet metal product. The moment can be a first order moment and/or a second order moment.

The medium may also include a comparing code segment that compares a feature vector of the sheet metal part product with a feature vector of another sheet metal part product. A similarity code segment can then determine a level of similarity between the sheet metal part products based upon the comparison.

The medium may also include a code segment for obtaining at least one other feature vector of the sheet metal product. In this case, a comparing code segment compares the feature vectors to determine a refined level of similarity. The comparison includes comparing the feature vectors of the sheet metal product with feature vectors of another sheet metal product to determine the refined degree of similarity between the sheet metal part products. A receiving code segment can be provided to receive a user selection of the feature vectors, and an assigned weight for each selected feature vector. The refined degree of similarity is then determined based upon the assigned weights and the selected feature vectors.

Another feature vector includes a sheet metal CT scan of a cross section of the sheet metal product. This feature vector can include performing a UZ analysis. In yet another embodiment of the present invention, a method is provided for searching for similar sheet metal part shapes. The method includes inputting a freehand sketch representing a sheet metal part shape, and determining at least one feature vector of the input sheet metal part shape. The method also includes comparing the at least one feature vector of the input sheet metal part shape with at least one corresponding feature vector of another sheet metal part shape to determine a degree of similarity between the sheet metal part shapes. The input may be a flat pattern outline. The input may also include cross section lines.

In one aspect, multiple feature vectors are determined for the input sheet metal part shape. In this case, the comparison includes comparing the multiple feature vectors of the input sheet metal part shape with multiple corresponding feature vectors of the other sheet metal part shape to determine a refined degree of similarity between the sheet metal part shapes.

In another embodiment of the present invention, a computer readable medium stores a program for searching for similar sheet metal part shapes. The program includes an input code segment that accepts input of a freehand sketch representing a sheet metal part shape that is used as a key part shape. The program also includes a feature vector code segment that determines at least one feature vector of the key part shape. The program further includes a similarity analysis code segment that compares the at least one feature vector of the key part shape with at least one corresponding feature vector of another sheet metal part shape to determine a degree of similarity between the sheet metal part shapes. The input code segment can accept input of a flat pattern outline and can also accept input of cross section lines.

In one aspect, the feature vector code segment determines multiple feature vectors of the key part shape. In this case, the similarity analysis code segment compares the multiple feature vectors of the key part shape with multiple corresponding feature vectors of the other sheet metal part shape to determine a refined degree of similarity between the sheet metal part shapes.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION

The present invention is directed to identifying patterns in sheet metal part shapes. The identified patterns can be used for searching sheet metal part models stored in a database.

An object of the present invention is to recognize patterns in sheet metal part shapes. Such patterns can be recognized by a variety of types of analysis. In one embodiment, a moment of inertia is applied to the sheet metal part to determine a characteristic of the part. Other types of analysis can be used to determine additional characteristics (i.e., feature vectors) of the sheet metal part. A user can specify multiple characteristics for a part, and thus, capture a view of the user.

By observing the different characteristics of the sheet metal shapes, a search engine specific to searching sheet metal part shapes can be defined. To overcome the ambiguity of previous search methods for 3D shapes, an aspect of the present invention incorporates dual dimensional feature extraction. Dual dimension feature extraction means that features are extracted from both a 2D (unfolded) and a 3D (folded) representation of the sheet metal part.

In yet another aspect of the present invention, a sheet metal normalization technique is provided to compare various sizes, shapes, and orientations of sheet metal parts in a uniform way. Furthermore, a sheet metal CT scan method is described to capture bending formation of a sheet metal part. Finally, another aspect of the present invention utilizes a freehand feature extraction method to perform a search from just a simple freehand sketch of a vague shape.

The pattern recognition of the present invention, when applied to searching for similar parts, provides several advantages for manufacturing processes in a factory compared with conventional systems. For example, the present invention helps cost estimation for a new part. The present invention also optimizes manufacturing processes. Moreover, the present invention helps to create a similar new part. With the present invention, a large amount of legacy data stored in databases suddenly becomes reusable data, and thus a great asset for the user.

Figure 1:
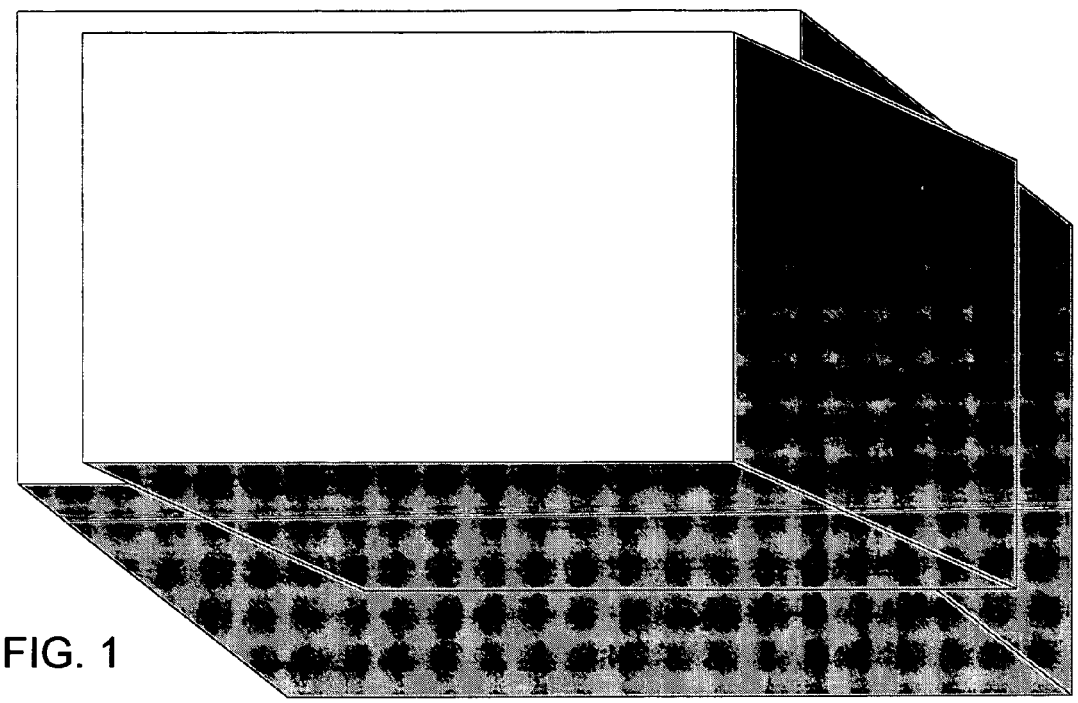
FIG. 1 illustrates overlapping solid shapes.
Figure 2:
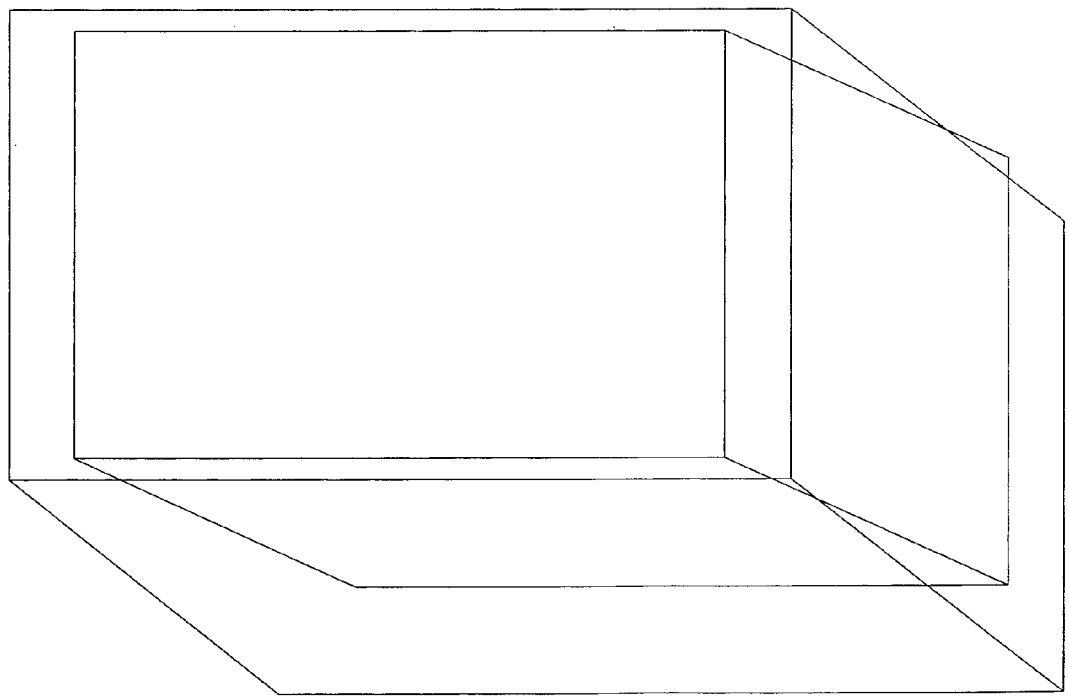
FIG. 2 illustrates overlapping sheet metal shapes.
Figure 3:
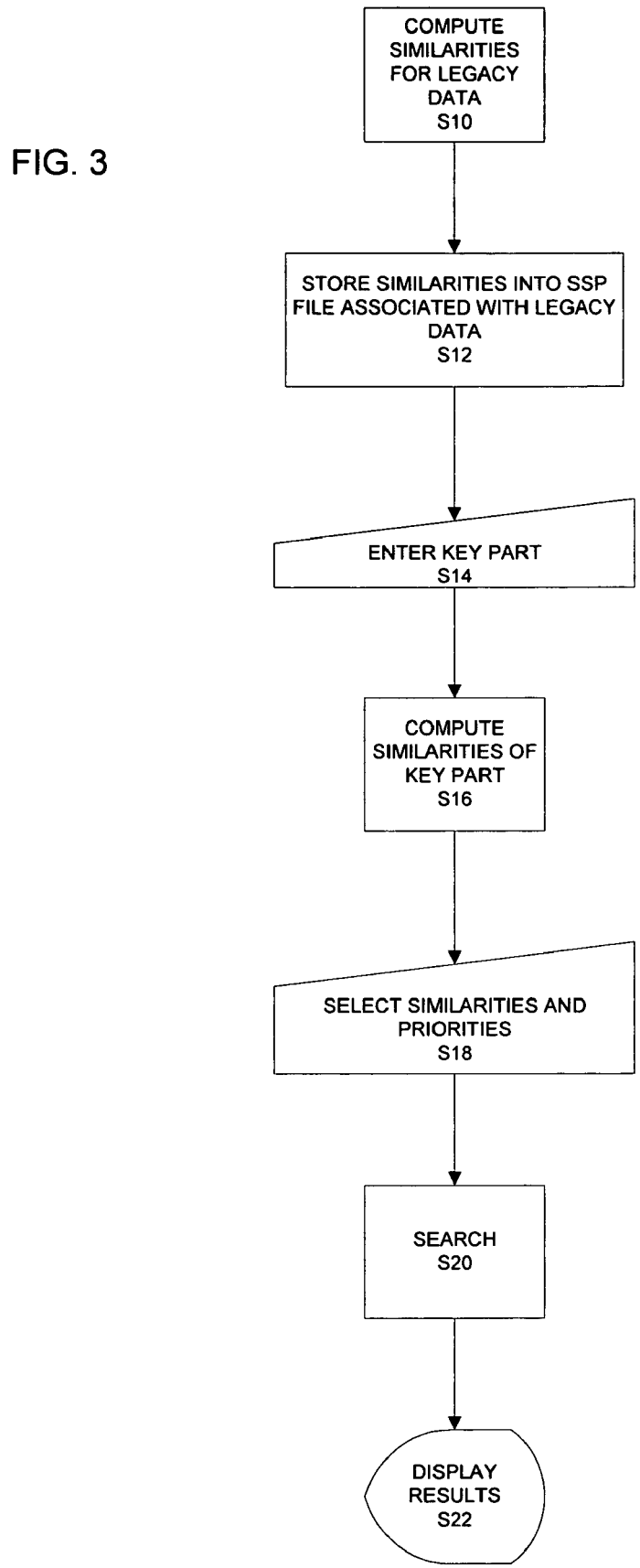
FIG. 3 shows a process for creating a sheet metal part similarity database and searching the database for similar parts, according to an aspect of the present invention.

An embodiment of the present invention is now described with respect to FIG. 3. At step S10, similarities for all legacy files, which are stored in a database, are calculated. Discussion of how the similarities are calculated will be provided later. Next, at step S12, the computed similarities are stored in a file, e.g., a SSP file. The SSP file is then associated with the legacy data file.

Figure 4:
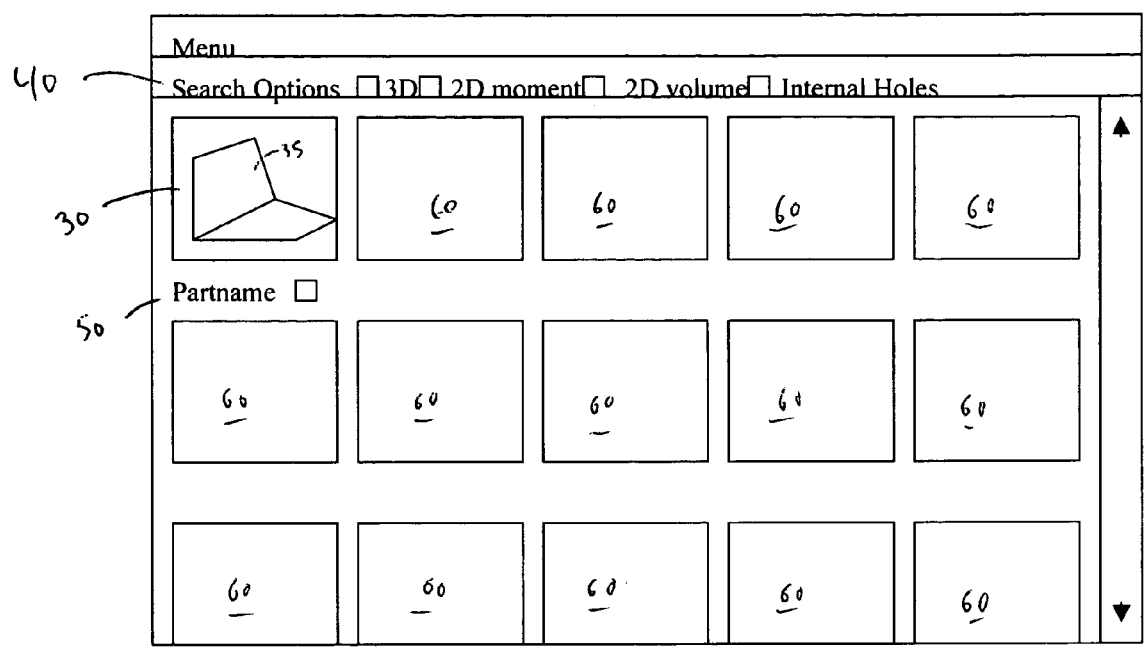
FIG. 4 shows a display of an exemplary similar part search screen, according to an aspect of the present invention.

The user then enters the features he is looking for, or the similarities of a target part, at step S14. The user entered information will be referred to as a key part. Exemplary manners in which the user can enter the key part are: selecting an existing part; roughly sketching a flat shape; and roughly sketching cross section lines. In the embodiment illustrated in FIG. 4, the upper left corner 30 of a parts grid is reserved for displaying a search key part. This box 30 is highlighted to distinguish the key part from other displayed parts (not shown).

At step S16, similarities of the key part are calculated. Prior to conducting the search, the user specifies the similarities (i.e., search options) he is focusing on, as well as the priority of each similarity, at step S18. For example, referring to FIG. 4, four search options 40 are presented: 3D, 2D moment, 2D volume, and internal holes. If the user is primarily concerned with holes within the sheet metal part model, the user could specify internal holes as a search option, by checking the associated box, and then assign a high priority to the internal holes feature, via another screen (not shown). Finally, at step S20 the search is performed and at S22 the results are displayed.

Exemplary manners for inputting the key part are now further described. A first mode will be referred to as a browsing mode. Referring again to FIG. 4, parts from a database are displayed in alphabetical order. Although FIG. 4 only shows a single part 35, each box 60 can display a part. The user selects a search key part by clicking a check box next to the desired part name 50. In one embodiment, only a single part can be selected. Subsequently, the user selects search option(s) 40 (and weights for each option) and then instructs the search to begin. The display will be updated by showing the selected search key part in the key part box 30, and the rest of the parts in the order of similarity. In one embodiment, the results can be sorted by priority of the similarities.

Another way for the user to specify the key part will be referred to as a freehand search. In this embodiment, users can create a simple freehand sketch using a mouse or a pen movement of a tablet to draw a rough sketch of a search key shape. The entered sketch does not have to be a sheet metal shape. The user can then copy and paste the image into the search application, where the image is displayed in the key part box 30. The option selection and result display is similar to that described above. A search can then be based on this rough sketch.

To create the rough sketch, a user interface is provided to specify a part shape by rough sketch entry. For example, the user can roughly draw a flat pattern outline or cross section lines of a search part in a drawing application, such as Microsoft Paint, available from Microsoft Corp., and fill the drawing with any color.

Another input method uses 2D orthographic views of a part. In contrast to prior art systems that required the difficult process of creating a 3D model from input 2D views, the present invention searches based upon the input 2D orthographic views themselves. In order to search based upon the input 2D views, an aspect the present creates 2D views of each legacy part stored in the database and stores the 2D views along with the part data. In one embodiment, three views are created for each part in addition to each view of the flange. Subsequently, 2D features are extracted and a 2D search occurs.

A tracing method can also be used as input. In this case, a drawing of a complex part is provided on paper. The user then traces significant features and inputs the traced outline into the computer, e.g., by scanning. The outline is then searched. If the drawing is scanned first, e.g., into a bitmap file, the user can select critical points of the drawing using the computer, and then connect the critical points to create an outline of significant features. The outline is then searched.

Several other input methods include searching: a silhouette of part, a perimeter (i.e., outside boundary) of a part, a total area of a part, a bounding box of a part, a moment of a part and a centroid of a part.

Description of pattern recognition (or feature extraction) will now be provided. In one embodiment, a moment of inertia of a 3D model is used. The moment of a 3D model is defined in Equation 1.

$$m_{lmn} = \int\int_{-\infty}^{+\infty}\int x^l y^m z^n \rho(x, y, z) dx\,dy\,dz \qquad (1)$$

Here $\rho(x, y, z)$ is the density function; l, m and n are whole numbers and l+m+n is the order of the moment.

Prior to performing feature extraction or geometric comparison, sheet metal shapes have to be normalized in a uniform way in order to perform an accurate comparison. In an embodiment of the present invention, three types of normalization are performed. Origin normalization uses a center of mass (i.e., centroid) as an origin of all shapes. Volume normalization uses a constant value "C" as a volume or area of all shapes. Because sheet metal shapes are essentially flat, volume is roughly equivalent to area. Orientation normalization uses a principal moment at the centroid as an orientation of all shapes. After the normalization occurs (including eliminating thickness), the part is represented by a mesh, in a known manner, and the analysis of the mesh occurs.

In one embodiment, second order translation, scale and rotation invariant moments are used for pattern recognition purposes. Translation invariance is obtained by aligning the centroid of the object with the origin of the coordinate system. The centroid of the object is as shown in Equation 2.

$$(\bar{x}, \bar{y}, \bar{z}) = \left(\frac{m_{100}}{m_{000}}, \frac{m_{010}}{m_{000}}, \frac{m_{001}}{m_{000}}\right) \qquad (2)$$

Moments about the coordinate system fixed at the centroid of the object are known as central moments. Equation 3 gives the formula for calculating the central moments, $\mu_{lmn}$.

$$\mu_{lmn} = \int\int_{-\infty}^{+\infty}\int (x-\bar{x})^l (y-\bar{y})^m (z-\bar{z})^n \rho(x-\bar{x}, y-\bar{y}, z-\bar{z}) dx\,dy\,dz \qquad (3)$$

Scale invariance along with translation invariance is obtained by dividing the second order central moments with a scale factor as shown in Equation 4.

$$I_{lmn} = \frac{\mu_{lmn}}{\mu_{000}^{5/3}} \qquad (4)$$

Finally, for rotation invariance the coordinate axes, fixed to the object, are oriented in a way such that the rotation matrix, shown in Equation 5, becomes diagonal.

$$M = \begin{bmatrix} I_{200} & I_{110} & I_{101} \\ I_{110} & I_{020} & I_{011} \\ I_{101} & I_{011} & I_{002} \end{bmatrix} \qquad (5)$$

This rotation of the coordinate axes is obtained from the eigenvectors of M and it aligns the principal axes of the object along the coordinate axes.

Moment invariants are derived from second order moments and are invariant to translation, scaling and rotation. They are coefficients of the characteristic equation shown in Equation 6.

$$P(\lambda) = -\lambda^3 + a\lambda^2 - b\lambda + c = \begin{vmatrix} I_{200} - \lambda & I_{110} & I_{101} \\ I_{110} & I_{020} - \lambda & I_{011} \\ I_{101} & I_{011} & I_{002} - \lambda \end{vmatrix} \quad (6)$$

Here a, b and c are the three moment invariants and their values are given in Equations 7–9. They form a feature vector, which can be used for shape comparisons.

$$a = I_{200} + I_{020} + I_{002} \quad (7)$$

$$b = I_{200}I_{020} + I_{020}I_{002} + I_{002}I_{200} - I_{011}^2 - I_{101}^2 - I_{110}^2 \quad (8)$$

$$c = I_{200}I_{020}I_{002} + 2I_{011}I_{101}I_{110} - I_{200}I_{011}^2 - I_{020}I_{101}^2 - I_{002}I_{110}^2 \quad (9)$$

Just like moment invariants, second order principal moments can also be used for pattern recognition. Second order principal moments are obtained by finding the three roots of the characteristic equation shown in Equation 6. It is noted that second order moments tend to designate symmetrical parts as similar. Thus, a second order moment can be used to find symmetrical parts.

Figure 11:
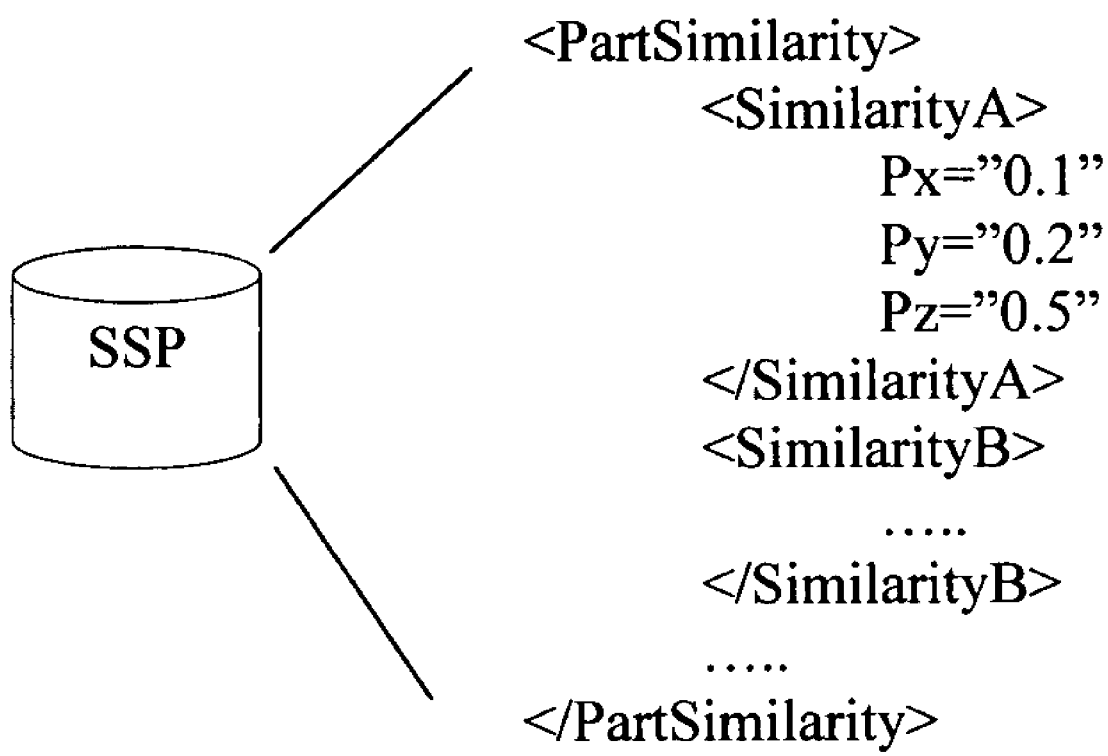
FIG. 11 shows an exemplary SSP file, according to an aspect of the present invention.

Alternate or additional features can also be extracted. The use of multiple features will be referred to as multiple feature vectors (MFV). The concept of MFV refines the search results. Using multiple feature vectors normalized for its similarity value enables users to improve the accuracy of the search. Alternate feature extractions include a 2D (flat) moment of inertia, a topological chart, and cross section diagrams:

In one embodiment, each type of analysis is used to determine characteristics of each previously stored sheet metal part shape, i.e., legacy data. The characteristics are stored into SSP files. Each similarity can be described as an XML element in an SSP file. An exemplary file is shown in FIG. 11.

In order to perform a search, the system computes user specified similarities of the part (e.g., entered by rough sketch) and compares the computed information in each SSP file. The system lists parts having a similarity close to the target part.

Figure 5:
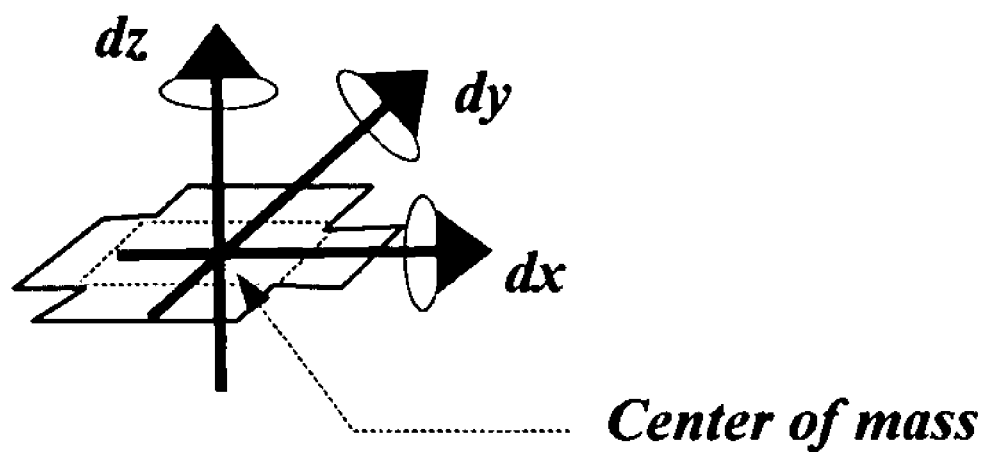
FIG. 5 illustrates a feature vector of a 2D part, according to an aspect of the present invention.

Feature extraction from freehand input is now explained. In order to extract feature vectors from a freehand sketch, a boundary of the sketch has to be detected. The area within the boundary is considered to be the volume of the sketch. After the volume has been detected from the rough sketch, a second order moment is extracted. Referring to FIG. 5, the second order moment of a flat shape is a vector that has three components: dx, dy, dz. The vector is normalized namely 0.0<dx,dy,dz<1.0 and the size is set to one. In addition the detected area is normalized.

Alternative or additional features can also be extracted from the freehand sketch. For example, a 2D rotation may occur. Usually, an unfolded 2D drawing of a sheet metal part is oriented either horizontally or vertically by the user. It may make a sense to use a comparison of unfolded shapes by flipping and rotating the shapes a given number of times to preserve the original orientation.

As noted above, once features are extracted from a freehand sketch, the extracted features are compared with the same features extracted from the legacy sheet metal shapes and the results can then be displayed.

Figure 6:
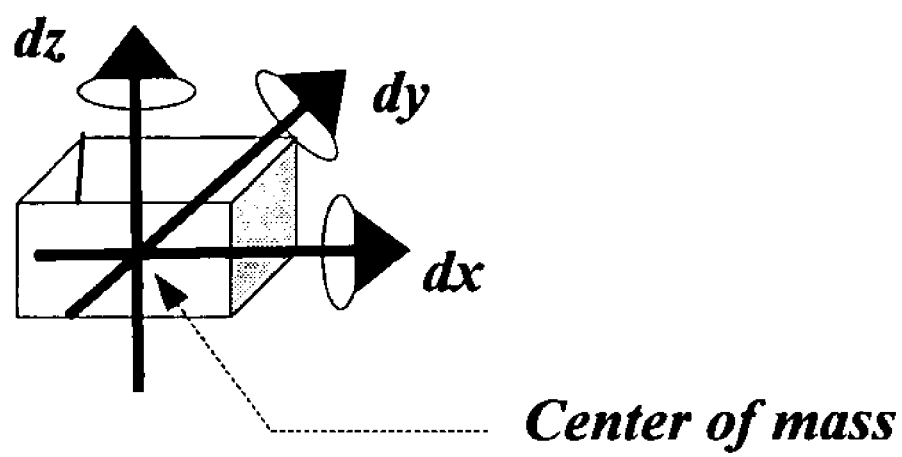
FIG. 6 illustrates a feature vector of a 3D part, according to an aspect of the present invention.

FIG. 6 illustrates a second order moment of a 3D shape, which can be used as a feature vector. The second order moment of a part is a vector that has three components: dx, dy, dz. The vector is normalized, namely 0.0<dx,dy,dz<1.0 and the size is set to one.

When the area is used as a feature vector, a comparison of unfolded sheet metal shapes oriented around a second order moment occurs.

Figure 7A:
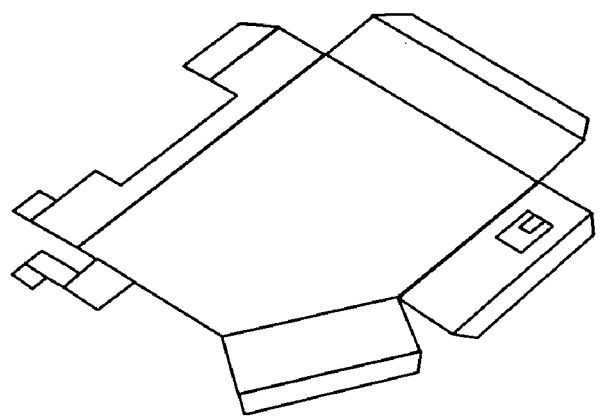
FIGS. 7A, 7B, and 7C show a part, identified bend lines, and identified faces and bend lines, respectively, according to an aspect of the present invention.

In one embodiment, a topological chart, which describes how faces are connected by bend lines, is defined as a similarity. Computation of a topological chart for an exemplary part shown in FIG. 7A is described below.

Figure 7B:
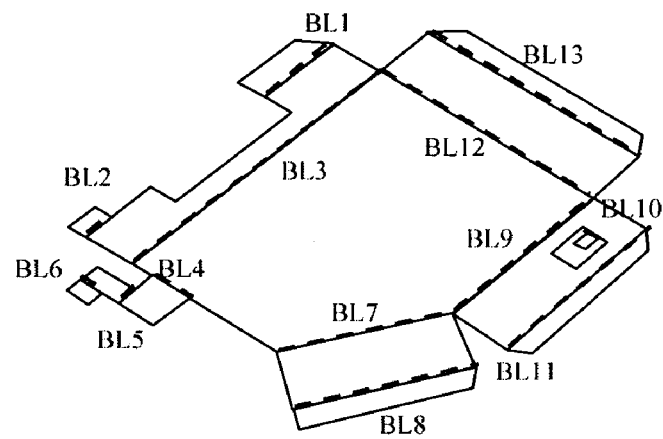

First, bend lines are detected from the flat data in legacy files, which store bend line attributes. FIG. 7B shows bend lines of the part. Some of the bend line attributes, e.g., bend angle, bend direction (Front/Back) and bend flange type (Flange/Inner Tab) are stored in a temporary area, as shown in Table 1 below.

TABLE 1

| Bend Line id | Front/Back | Angle | Flange/Inner Tab |
|---|---|---|---|
| BL1 | Front | 90 | Flange |
| BL2 | Back | 135 | Flange |
| BL3 | Front | 90 | Flange |
| BL4 | Back | 90 | Flange |
| BL5 | Front | 90 | Flange |
| BL6 | Front | 135 | Flange |
| BL7 | Front | 90 | Flange |
| BL8 | Front | 90 | Flange |
| BL9 | Front | 90 | Flange |
| BL10 | Front | 90 | Flange |
| BL11 | Back | 90 | Inner Tab |
| BL12 | Front | 90 | Flange |
| BL13 | Front | 90 | Flange |

Figure 7C:
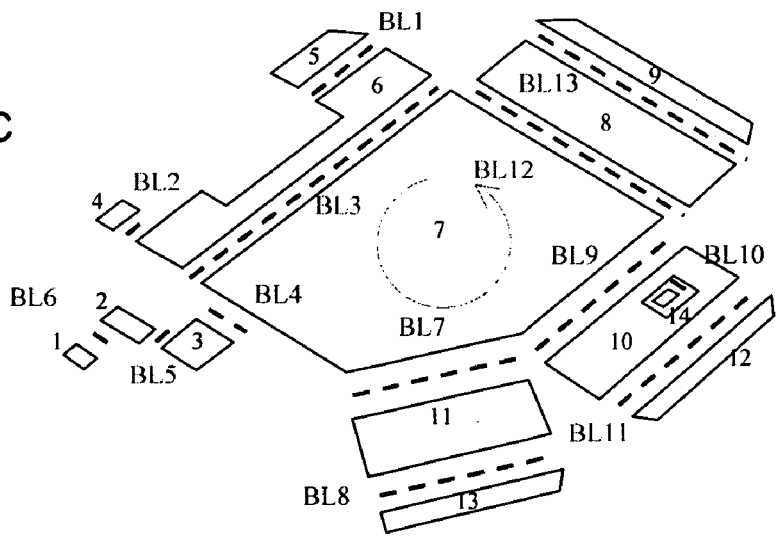

Next, faces are detected based upon the bendlines, as seen in FIG. 7C. The logic is well know and thus not described in detail here. The number of bend lines adjoining each face and their order (e.g., in a counterclockwise direction) are stored in a temporary area, as shown in Table 2. The order of bend lines is detected when an outline of a face is traced in a predefined direction (e.g., in a counterclockwise direction). This bend line order will be the order of face connection, described later.

TABLE 2

| Face ID | Number of bend line | Bend line and its order |
|---|---|---|
| 1 | 1 | BL6 |
| 2 | 2 | BL6, BL5 |
| 3 | 2 | BL5, BL4 |
| 4 | 1 | BL2 |
| 5 | 1 | BL1 |
| 6 | 3 | BL1, BL2, BL3 |
| 7 | 5 | BL3, BL4, BL7, BL9, BL12 |
| 8 | 2 | BL12, BL13 |
| 9 | 1 | BL13 |
| 10 | 3 | BL9, BL11/BL10 |
| 11 | 2 | BL7, BL8 |
| 12 | 1 | BL11 |
| 13 | 1 | BL8 |
| 14 | 1 | BL10 |

Figure 8A:
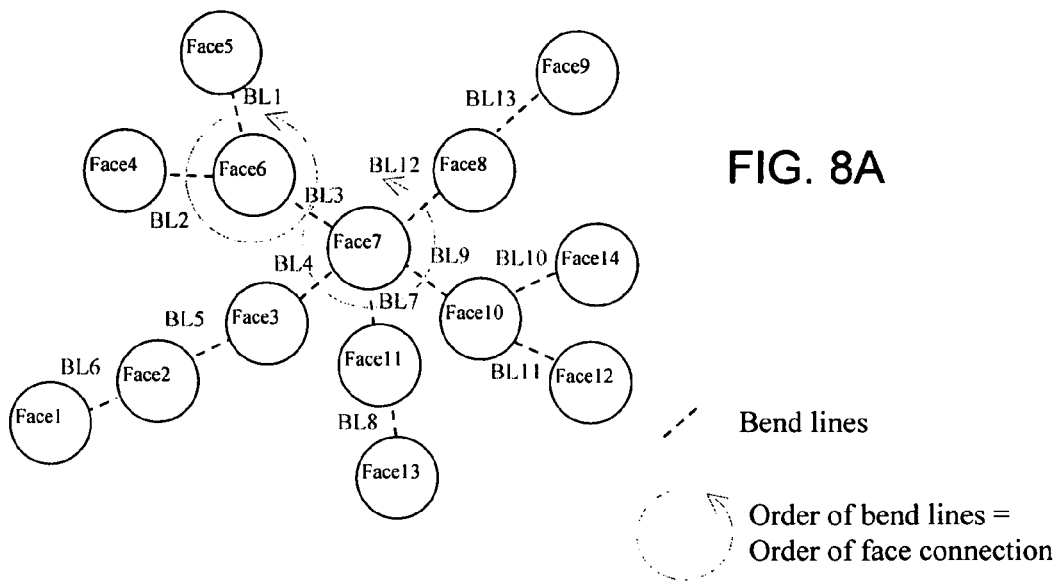
FIGS. 8A, 8B, and 8C show a topology chart, a normalized topology chart, and a normalized topology chart including bend lines, respectively, according to an aspect of the present invention.
Figure 8B:
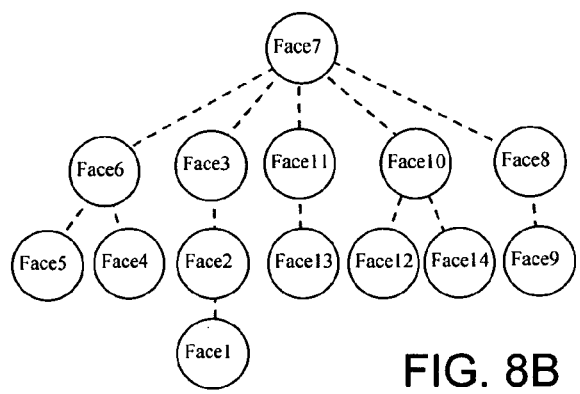

The faces and bendlines, as seen in FIG. 7C, are described as a topological chart, as seen in FIG. 8A. The topological chart is normalized, as seen in FIG. 8B. The topological chart is normalized by the following rule: the face having the largest number of bend lines is defined as the root face. If there are multiple candidates, the first detected face is defined as the root.

The topology chart can be described by a text string in which "R" indicates the root face, and "F" indicates a non-root face. A bracket "( )" indicates a depth from the root face. An exemplary string corresponding to the topology chart shown in FIG. 8B is as follows: R(F(F,F), F(F(F)), F(F), F(F,F), F(F))

Preferably, all topology charts for each bend line order are identified. Thus, the following representations correspond to FIG. 8C:

R(F(F,F), F(F(F)), F(F), F(F,F), F(F))

Figure 8C:
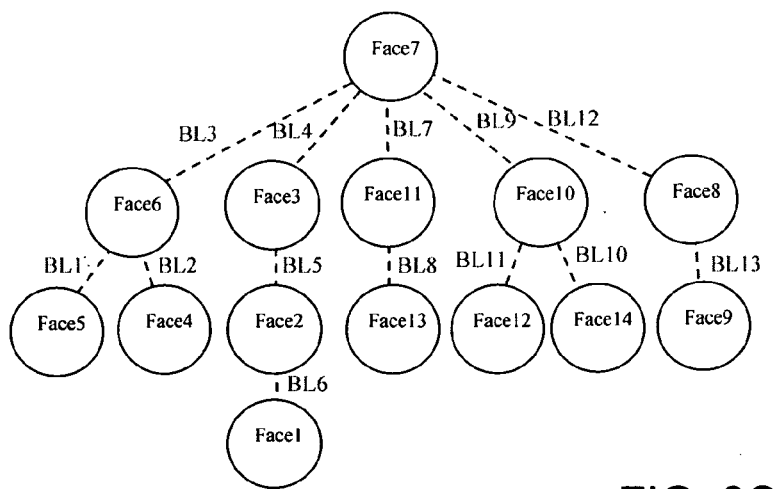
Figure 9:
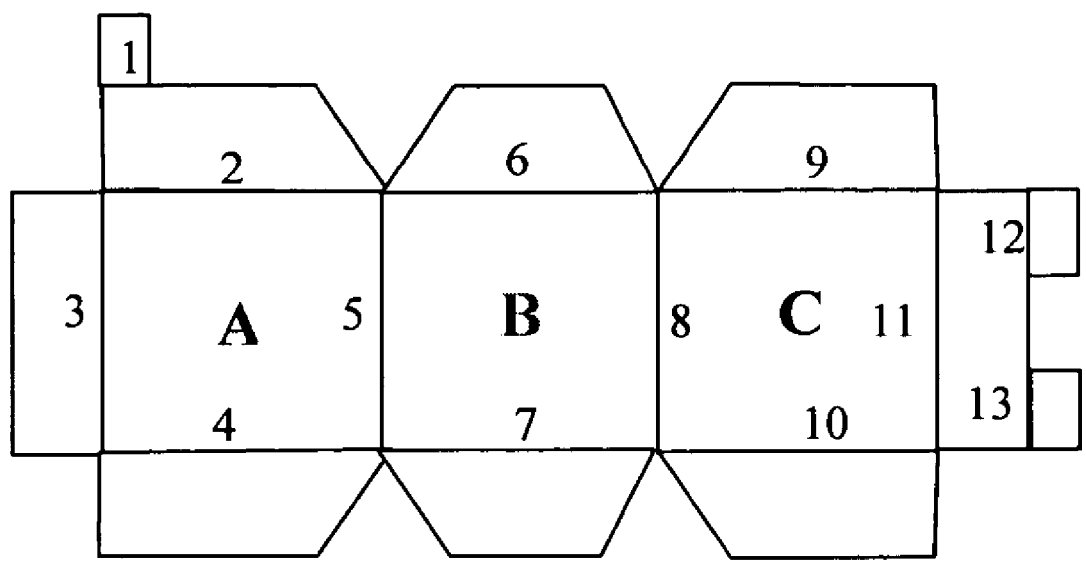
FIG. 9 shows a part with multiple candidate root faces, according to an aspect of the present invention.

The bend line IDs also can be described as a text string. A string respresenting FIG. 8C is as follows: (3(1,2), 4(5(6)), 7(8), 9(11,10), 12(13)).

Figure 10A:
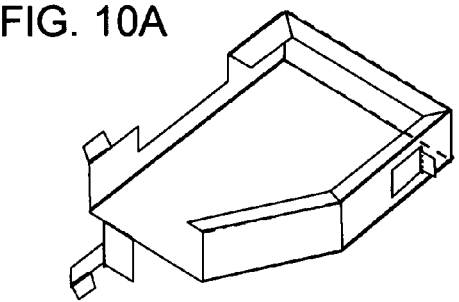
FIGS. 10A, 10B, 10C, and 10D show a part, bend line vectors, grouped bend line vectors, and grouped bend line vectors superimposed on the part, respectively, according to an aspect of the present invention.

Another type of feature is referred to as CT Scan Cross Section, in which multiple profile geometries are used as a feature vector. In other words, a cross section diagram, which is created by a bend line group, is defined as a similarity. The computation for the part shown in FIG. 10A is now described.

Figure 10B:
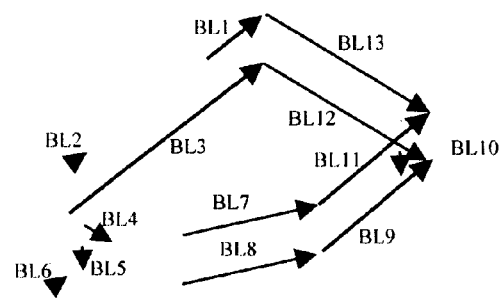
Figure 10C:
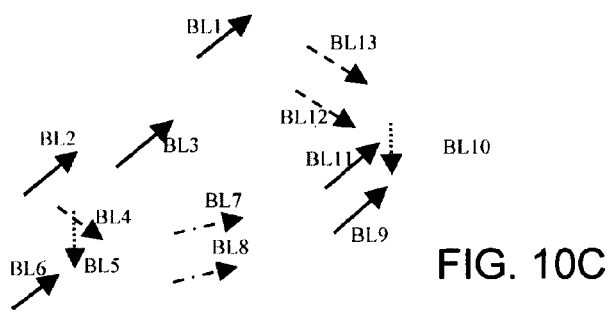
Figure 10D:
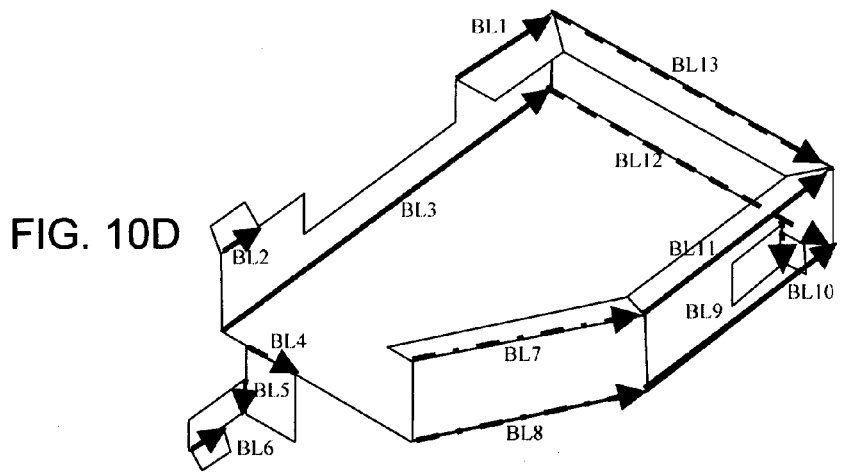

Initially, all bend-line vectors in a part are located, as seen in FIG. 10B. The vectors are then normalized and the bend lines grouped by components, as seen in FIG. 10C. In other words, parallel lines are grouped together. A table is then created, similar to Table 3 below.

TABLE 3

| Bend Line | Group |
|---|---|
| BL1 | 1 |
| BL2 | 1 |
| BL3 | 1 |
| BL6 | 1 |
| BL9 | 1 |
| BL11 | 1 |
| BL4 | 2 |
| BL12 | 2 |
| BL13 | 2 |
| BL5 | 3 |
| BL10 | 3 |
| BL7 | 4 |
| BL8 | 4 |

Bend line continuity is searched, using the topology chart and bend line groups. The bend line sequences are searched from edge face to edge face. The following bend line sequences are defined in this sample:

Group1 (BL1, BL3, BL9, BL11)
Group1 (BL2, BL3, BL9, BL11)
Group1 (BL1, BL2)
Group1 (BL6)
Group2 (BL4, BL12, BL13)
Group3 (BL5)
Group3 (BL10)
Group4 (BL7, BL8)

By reviewing the bend line attribute table (Table 1), the bend line sequences are described by the following text string:

(n)(Flange)(FP,FP,FP,FP)

where (n) represents the bend line group; (Flange) represents an outside flange; (Tab) represents an inner tab flange; F- represents a front bend; B- represents a back bend; -P represents a perpendicular bend; -A represents an Acute bend; and -O represents an obtuse bend.

Thus, the following bend line sequences are defined:

| Group1 (BL1, BL3, BL9, BL11) | => (1)(Flange)(FP, FP, FP, FP) |
| Group1 (BL2, BL3, BL9, BL11) | => (1)(Flange)(BO, FP, FP, FP) |
| Group1 (BL1, BL2) | => (1)(Flange)(FP, BO) |
| Group1 (BL6) | => (1)(Flange)(FO) |
| Group2 (BL4, BL12, BL13) | => (2)(Flange)(FP, FP, BP) |
| Group3 (BL5) | => (3)(Flange)(FP) |
| Group3 (BL10) | => (3)(Tab)(BP) |
| Group4 (BL7, BL8) | => (4)(Flange)(FP, FP) |

Figure 12A:
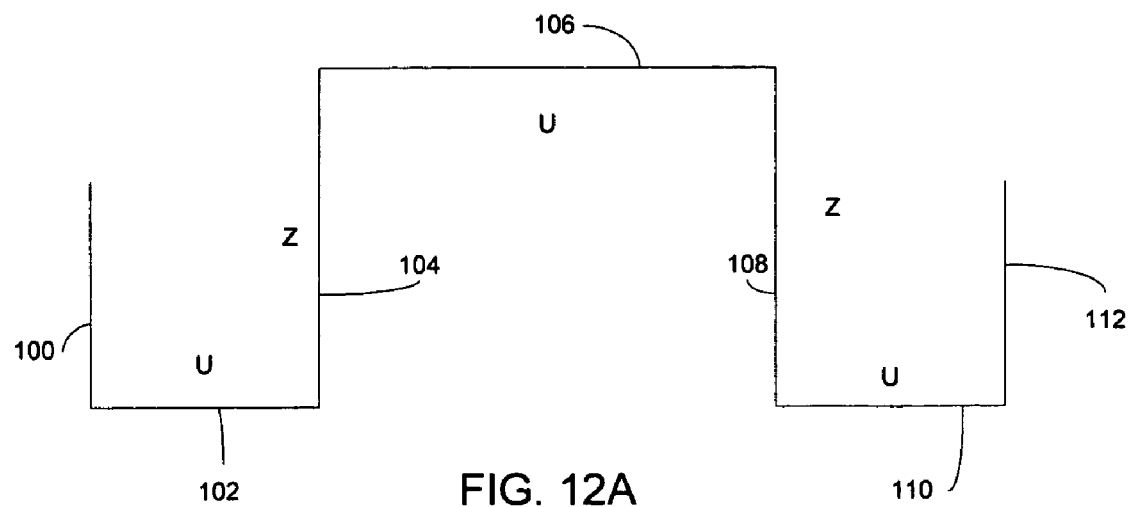
FIGS. 12A and 12B show part cross sections subjected to a UZ analysis, according to an aspect of the present invention.

Another aspect of CT Scan includes a UZ presentation. According to this algorithm, each set of three adjacent lines of a cross section are examined. Referring to FIG. 12A, lines 100, 102, and 104 are first examined. It can be seen that the first three lines comprise a U shape. The next three lines (i.e., 102, 104, 106) are then examined. It can be seen that these three lines comprise a Z shape. The process continues until each set of three adjacent lines is examined. The analysis results in a UZUZU pattern for the cross section shown in FIG. 12A.

Figure 12B:
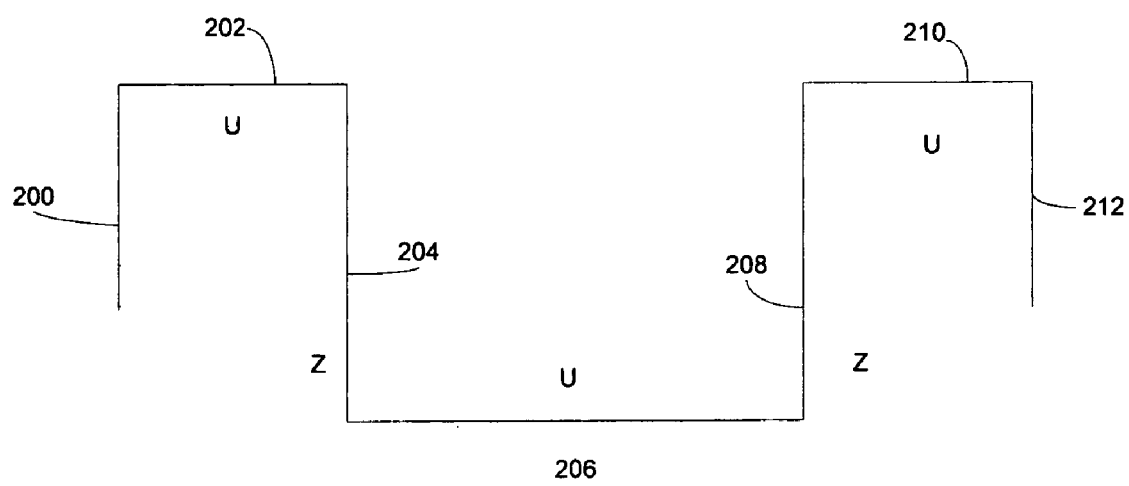

Referring to FIG. 12B, lines 200, 202, and 204 are analyzed. It can be seen that the first three lines comprise a U shape. The next three lines (i.e., 202, 204, 206) are then examined. It can be seen that these three lines comprise a Z shape. The process continues until each set of three adjacent lines is examined. The analysis results in a UZUZU pattern for the cross section shown in FIG. 12B.

The UZ analysis eliminates orientation as a factor when comparing parts. For example, the mirror image parts shown in FIGS. 12A and 12B will appear similar because both parts result in the same UZ pattern. In one embodiment, storing the pattern includes creating a bit stream in which 0 corresponds to a U and 1 corresponds to a Z. In the example, the corresponding bit stream would be 01010.

Although several feature vectors have been explained in detail, the present invention is not limited to the described feature vectors. Thus, additional feature vectors are considered to be within the scope of the present invention. For example, additional feature vectors can include first order moments, various geometric parameters, such as a bounding box, an aspect ratio, etc. Moreover, product parameters, i.e., attributes of products, such as material type, material thickness etc. can also be used as a feature vector. Internal holes, for example, the shapes and mass of internal holes can also be used as a feature vector.

A similarity view of the computer system and users may be very different. Thus, users can express their similarity view by selecting MFV(s) to be used for a search and giving a weight to each vector.

An exemplary process for computing similarity is now discussed. In this example, the feature extraction operation results in three values (seen, for example, in equations 7–9), which can be designated as an X-value, a Y-value, and a Z-value. Thus, each extracted feature for a part can be plotted in a 3D feature space. Although the present example discusses a 3D feature space, it is understood that the number of dimensions of the feature space is dictated by the feature extraction operation. For example, an area feature extraction would result in a single dimension feature space.

Returning to the example, a similarity can be computed by calculating the distance in the 3D space between any two parts. More specifically, the feature vector for each of the legacy parts is plotted in the 3D space, as is the feature vector of the key part being searched. The distance between the similarity vector of the key part and the similarity vector of each legacy part is calculated. The closest part in the feature space will be designated the most similar part.

If multiple similarities are used, the user can assign weights for each feature vector. The distances are then summed based upon the weights. In one embodiment, the distance is not normalized. However, if the space size is known, the distance can be normalized.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

What is claimed is:

1. A method of specifying characteristics of a sheet metal product, comprising:
    obtaining feature vectors derived from at least one characteristic extraction method, at least one feature vector having a size and a direction;
    comparing a feature vector of the sheet metal product with a feature vector of another sheet metal product; and
    determining a level of similarity between the sheet metal products based upon the comparison.

2. The method of claim 1, wherein the feature vector is derived by applying a moment as the characteristic extraction method.

3. The method of claim 2, in which the moment comprises a second order moment.

4. The method of claim 2, in which the moment comprises a first order moment.

5. The method of claim 2, in which the applying further comprises applying the moment to a 3D sheet metal part shape.

6. The method of claim 2, in which the applying further comprises applying the moment to a 2D sheet metal pad shape.

7. The method of claim 2, in which the applying further comprises applying the moment to a 3D sheet metal part shape and applying the moment to a 2D sheet metal part shape.

8. The method of claim 1, further comprising:
    obtaining at least one other feature vector of the sheet metal product; and
    comparing the feature vectors of the sheet metal product with a plurality of corresponding feature vectors of the other sheet metal product to determine a refined degree of similarity between the sheet metal products.

9. The method of claim 8, in which a user selects the feature vectors, and assigns a weight to each selected feature vector, the refined degree of similarity being determined based upon the assigned weights and the selected feature vectors.

10. The method of claim 1, wherein the feature vector is derived by performing a sheet metal CT scan cross section as the characteristic extraction method.

11. The method of claim 10, wherein the feature vector is derived by performing a UZ analysis as the characteristic extraction method.

12. A computer readable medium storing a program for specifying characteristics of a sheet metal product, comprising:
    a feature vector code segment that obtains a first plurality of feature vectors derived from at least one characteristic extraction method, at least one feature vector having a size and a direction;
    a comparing code segment that compares the at least one feature vector of the sheet metal product with a feature vector of another sheet metal product; and
    a similarity code segment that determines a level of similarity between the sheet metal products based upon the comparison.

13. The medium of claim 12, in which the feature vector is derived by applying a moment as the characteristic extraction method.

14. The medium of claim 13, in which the moment comprises a second order moment.

15. The medium of claim 13, in which the moment comprises a first order moment.

16. The medium of claim 12, in which the obtaining code segment further obtains at least one other feature vector of the sheet metal product, the comparing code segment further compares the at least one feature vector and the at least one other feature vector, and the similarity code segment further determines a refined level of similarity based on the further comparing, the further comparing comprising comparing the plurality of feature vectors of the sheet metal product with a plurality of corresponding feature vectors of another sheet metal product.

17. The method of claim 16, further comprising an input receiving code segment that receives a user's selection of the plurality of the feature vectors, and assignment of a weight to each selected feature vector, the refined degree of similarity being determined based upon the assigned weights and the selected feature vectors.

18. The medium of claim 12, wherein the at least one feature vector is derived by performing a sheet metal CT scan cross section as the characteristic extraction method.

19. The medium of claim 18, wherein the at least one feature vector is derived by performing a UZ analysis as the characteristic extraction method.

20. A method for searching for similar sheet metal part shapes, comprising:
   inputting a freehand sketch representing a sheet metal part shape;
   determining at least one feature vector of the input sheet metal part shape; and
   comparing the at least one feature vector of the input sheet metal part shape with at least one corresponding feature vector of another sheet metal part shape to determine a degree of similarity between the sheet metal part shapes.

21. The method of claim 20, in which the inputting further comprises inputting a flat pattern outline.

22. The method of claim 20, in which the inputting further comprises inputting cross section lines.

23. The method of claim 20, in which the determining further comprises determining a plurality of feature vectors of the input sheet metal part shape, and
   the comparing further comprises comparing the plurality of feature vectors of the input sheet metal part shape with a plurality of corresponding feature vectors of the other sheet metal part shape to determine a refined degree of similarity between the sheet metal part shapes.

24. A computer readable medium storing a program for searching for similar sheet metal part shapes, comprising:
   an input code segment that accepts input of a freehand sketch representing a sheet metal part shape that is used as a key part shape;
   a feature vector code segment that determines at least one feature vector of the key part shape; and
   a similarity analysis code segment that compares the at least one feature vector of the key part shape with at least one corresponding feature vector of another sheet metal part shape to determine a degree of similarity between the sheet metal part shapes.

25. The medium of claim 24, in which the input code segment further accepts input of a flat pattern outline.

26. The medium of claim 24, in which the input code segment further accepts input of cross section lines.

27. The medium of claim 24, in which the feature vector code segment further determines a plurality of feature vectors of the key part shape, and
   the similarity analysis code segment further compares the plurality of feature vectors of the key part shape with a plurality of corresponding feature vectors of the other sheet metal part shape to determine a refined degree of similarity between the sheet metal part shapes.

* * * * *

UNITED STATES PATENT AND TRADEMARK OFFICE
CERTIFICATE OF CORRECTION

PATENT NO. : 7,158,853 B2
APPLICATION NO. : 10/971124
DATED : January 2, 2007
INVENTOR(S) : Sakai et al.

It is certified that error appears in the above-identified patent and that said Letters Patent is hereby corrected as shown below:

On the cover page, item (56), FOREIGN PATENT DOCUMENTS, of the printed patent, add --EP 0187065 7/1996--.

On cover page 2, item (56), OTHER PUBLICATIONS, left column, line 48, of the printed patent, "GL Reference Manual" should be --GL Programming Guide--.

At column 12, line 5 (claim 6, line 2) of the printed patent, "sheet metal pad" should be --sheet metal part--.

Signed and Sealed this

Twenty-second Day of July, 2008

JON W. DUDAS
*Director of the United States Patent and Trademark Office*